United States Patent [19]

Clover, Jr. et al.

[11] 3,824,571

[45] July 16, 1974

[54] MAGNETIC BUBBLE GENERATION

[75] Inventors: Richmond B. Clover, Jr., Sunnyvale; Robert F. Waites, Palo Alto, both of Calif.

[73] Assignee: Hewlett Packard Company, Palo Alto, Calif.

[22] Filed: Apr. 9, 1973

[21] Appl. No.: 349,163

[52] U.S. Cl. .......... 340/174 TF
[51] Int. Cl. .......... G11c 11/14
[58] Field of Search .......... 340/174 TF

[56] References Cited

UNITED STATES PATENTS 3,662,359 5/1972 Genovese .......... 340/174 TF

*Primary Examiner*—James W. Moffitt
*Attorney, Agent, or Firm*—Ronald E. Grubman

[57] ABSTRACT

A magnetic bubble generator device is provided for nucleating magnetic bubbles in a wafer of magnetic material. The device includes an arrangement of permalloy elements which generate fringing magnetic fields near their ends when the elements are magnetized by an applied rotating magnetic field. These fringing fields penetrate the magnetic wafer, but are not large enough to induce reversal of the direction of the magnetization in the wafer. However, the device also includes a current line which generates a magnetic field when it is pulsed, this latter field adding to the fringing fields in a localized region of the magnetic wafer to produce a combined field in that region. The combined field is sufficiently strong to induce a localized reversal of the direction of magnetization in the magnetic wafer; i.e. to nucleate a magnetic bubble. The device may be used, for example, to write bits of information into a bubble memory.

7 Claims, 2 Drawing Figures

MAGNETIC BUBBLE GENERATION

BACKGROUND AND SUMMARY OF THE INVENTION

Magnetic bubble memory devices are a relatively new development in the area of computer memories. In these bubble memories, information bits are stored using a sequence of magnetic bubbles embedded in a thin magnetic wafer typically fabricated from a rare earth garnet material such as $Eu_2Er_1Fe_4GaO_{12}$ or $Gd_{1.5}Y_1Yb_{.5}Fe_4Ga_1O_{12}$. By applying a magnetic field to the wafer, some of the magnetic domains in the magnetic material can be collapsed into stable cylindrical domains of one polarization which will be embedded in a uniform background of the opposite polarization. The magnetic bubbles can be propagated around the wafer using an applied rotating magnetic field in conjunction with a pattern of permalloy elements overlayed on the wafer. This procedure is described e.g. in co-pending U.S. Pat. application Ser. No. 345,050, filed on Mar. 26, 1973, by Richmond B. Clover, entitled *Magnetic Bubble Propagation*, and assigned to the same assignee as the present application. Thus, it is possible to represent information bits by a sequence of magnetic bubbles moving past a detecting device, the presence of each bubble, for example, signifying a "1" data bit, while the absence of a bubble signifies a "0" data bit. In order to effectively use a magnetic bubble device as a read-write memory, it is necessary to have some means of generating the appropriate sequence of magnetic bubbles to correspond to any desired bit pattern; that is, there must be a mechanism for performing the "write" function of the memory. There are two basic mechanisms which have heretofore been employed to "write" data into bubble memories. These will be referred to herein as the "seed-splitting" mechanism and the "nucleation" mechanism.

In memories using a seed-splitting mechanism to write the data, a seed magnetic bubble is kept circulating at all times in a localized region of the wafer. For example, in the presence of a rotating magnetic field a seed bubble will circulate under a permalloy element in the shape of a square. Thus a permalloy square can be positioned immediately adjacent to another permalloy element which serves as the beginning of one of the permalloy tracks used to propagate the bubbles around the wafer. When the circulating bubble passes this other permalloy element, it will tend to strip across; i.e. the bubble will be attracted to both the generating square and the track element simultaneously (see e.g. the article entitled *Magnetic Bubbles* in Scientific American, June, 1971, by A. H. Bobeck and H. E. D. Scovil). In some devices, the bubble then spontaneously splits into two bubbles, the newborn bubble propagating down the track while the seed bubble continues circulating around the square in preparation for future bubble generation. It is evident that this spontaneous seed-splitting mechanism by itself can produce only an unbroken sequence of bubbles, i.e. a sequence representing all "1" bits. Thus, the actual writing must be done further down the propagating track by using another device usually referred to as a bubble transfer switch. A typical mode of operation is for the transfer switch to divert a bubble from the main path in response to a current pulse when it is desired to generate a "0" bit. However, bubble transfer switches add additional complexity to the bubble propagating circuitry. In other seed-splitting devices, the actual division of the bubble does not take place spontaneously, but only when a current pulse is applied to the region where the bubble is tripped out. Thus, by applying or not applying a current pulse, the device can be made to generate a bubble (a "1" bit) or not generate a bubble (a "0" bit) at each cycle.

All of the seed-splitting devices heretofore used have several limitations which are disadvantageous in a computer memory. One difficulty is that there must always be a parent seed bubble present in the device. Thus, the fabrication of the wafer must be carefully monitored so as to ensure that a parent seed bubble will be produced. Furthermore, it is often desirable to clear a working magnetic memory of all bubbles by the application of a large magnetic pulse. A clearing operation would be desirable, for example, if the device had been exposed to a spurious field which generated unwanted bubbles on the wafer. Unfortunately, the clearing operation cannot be performed on a seed-splitting memory since the seed bubble would be eliminated along with the other bubbles. Another disadvantage of a seed-splitting bubble generator is that the operating margins of the memory device may be reduced; i.e., the range of values of the applied bubble-stabilizing field and the applied rotating bubble-propagating field over which the device will operate without bubble propagation failure is restricted. The problem occurs in part because the seed bubble must stretch across two different types of elements, thereby increasing the probability of a bubble propagation failure. Usually, the effect is to reduce the high field end of the operating region. Yet another disadvantage of a seed-splitting write function generator is that it imposes a limitation on the velocity of propagation of the bubbles, which in turn limits the overall data processing rate of the memory. The velocity limitation arises because the same rotating magnetic field which propagates the bubble around the propagating track also drives the seed bubble around the permalloy square used as a generator. Thus, as described in the above-mentioned article by Bobeck and Scovil, the seed bubble traverses the perimeter of the square once for each cycle of the rotating field, a distance equal to about four times the width of the one period of the propagating pattern traversed by the propagating bubbles in the same time period. If the frequency of the rotating magnetic field is adjusted so that the seed bubble circulates near the limiting velocity of the garnet material, the propagating bubbles will travel at a very much lower velocity.

Many of the disadvantages of a seed-splitting generator are eliminated if data is written into the memory using an alternate technique commonly called bubble nucleation. The nucleation process uses the high fringing fields at the ends of a magnetized permalloy strip to reverse the spin direction in a localized region on the magnetic wafer. In the presence of an external magnetic field (a bias field) applied to the wafer, the spin-flipped region will stabilize as a magnetic bubble, which can then be propagated around the wafer. A typical nucleation process known in the prior art is implemented by fabricating the magnetic wafer with an oxide layer, e.g., $SiO_2$, superimposed on a garnet substrate of the wafer. The permalloy elements which serve to propagate the magnetic bubbles are overlayed on the oxide layer, which serves as a spacer to isolate the permalloy elements from the magnetic wafer. Thus, when a rotating magnetic field is applied to the wafer to magnetize the permalloy elements for the purpose of propagating bubbles, the spacer prevents spurious nucleation of bubbles in the wafer by the fringing fields at the ends of the permalloy elements. However, if it is desired to nucleate bubbles at a particular location on the wafer, the oxide spacer can be etched through to create a recessed window at that location. A permalloy element positioned in the recess will be much closer to the wafer than the remaining elements, so that the fringing fields from that element can create a magnetic bubble. This nucleation process does not eliminate the requirement for a bubble transfer switch to complete the write function, but it does eliminate the velocity limitation and the reduced operating margins that inhere in the seed-splitting method. On the other hand, a significant disadvantage of the nucleation technique heretofore known is the necessity for an additional masking step in the fabrication of the wafer, in order to etch the recessed window into the oxide layer.

In accordance with the illustrated preferred embodiments of the present invention there is provided a magnetic bubble generator which uses a number of permalloy elements in conjunction with an electrical current line overlay to nucleate magnetic bubbles in a magnetic wafer. In operation, the bubbles are nucleated when two magnetic fields are simultaneously applied to a localized region of the garnet material which supports the bubble domains, the combined fields adding to provide a total magnetic field large enough to induce spin reversal in the localized region. More particularly, one of the two magnetic fields is provided by the fringing fields generated at the ends of a cluster of permalloy elements. These elements are themselves magnetized by a rotating magnetic field which also serves to magnetize the permalloy elements in the track used for propagating bubbles. The cluster of permalloy elements is arranged so that the fringing fields provided by these elements are not sufficiently strong to induce spin reversal in the wafer. However, an additional magnetic field is provided by pulsing the current line overlayed on the magnetic wafer. The current line includes a loop-like segment encompassing the localized region where it is desired to reverse the polarization. When the current line is pulsed, it generates a magnetic field which adds to the fringe field, the combined field strength being greater than the nucleation threshold for reversal of the spins. Thus a spin reversal domain is formed which stabilizes as a magnetic bubble and moves onto the propagating track under the influence of the rotating field. An advantage of the invention is that a bubble will be produced only when the current line is pulsed, so the device may be used directly to write information into a memory, no additional bubble transfer switches being required. A further advantage of the invention is that no seed bubble is required so that a memory chip using the bubble generator can be reset by sweeping it clean of all bubbles. Yet a further advantage of the invention is that while the bubble generator operates by nucleation, the fabrication of the chip does not require the additional masking step to etch a window in a spacer layer as was necessary in previous nucleation type bubble generators.

DESCRIPTION OF THE INVENTION

Figure 1:
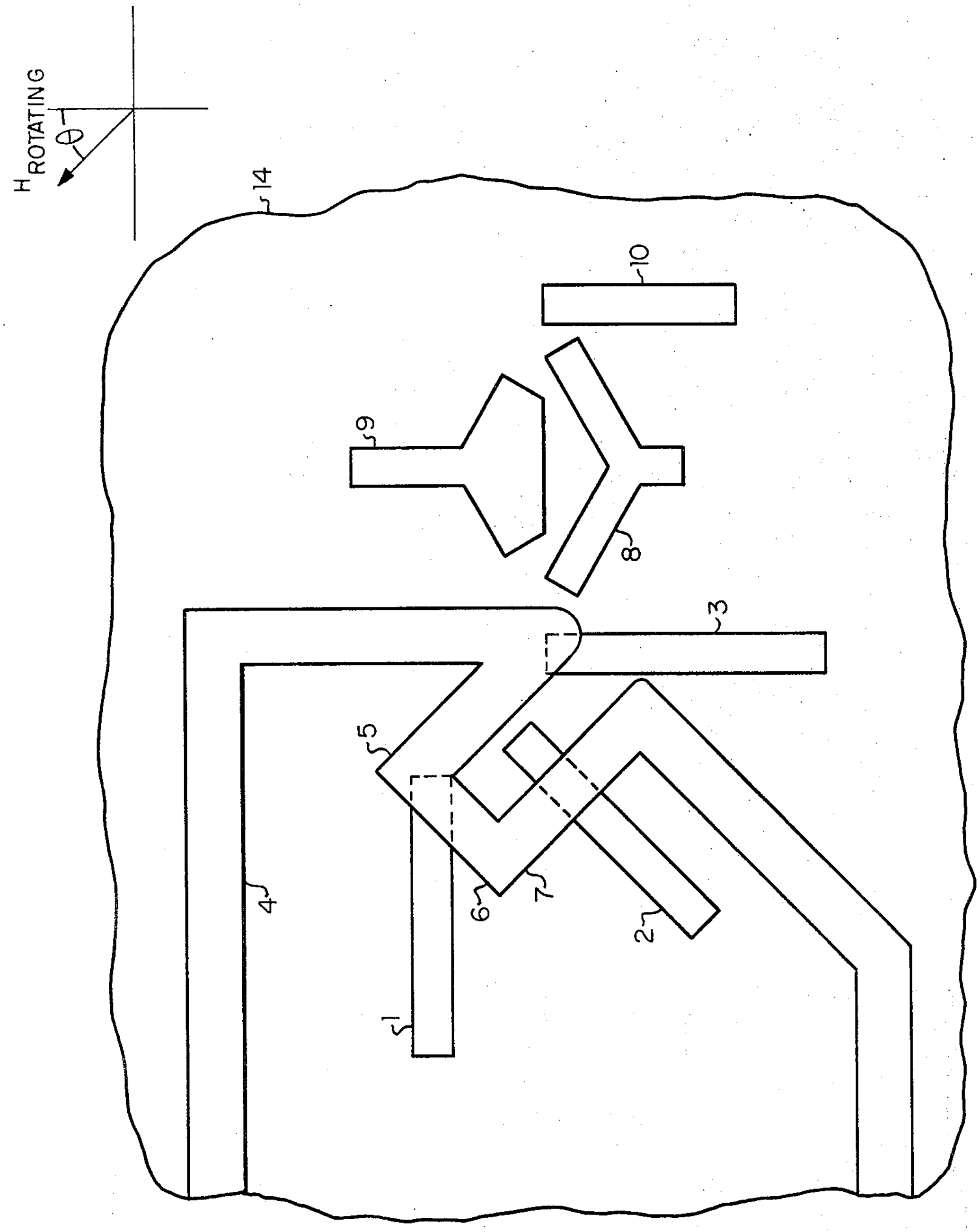
FIG. 1 illustrates a magnetic bubble generator in accordance with one embodiment of the present invention.

Referring to FIG. 1 there is shown a magnetic bubble generator comprising three strips 1, 2, and 3 of a permeable magnetic material, e.g. permalloy (80-20 NiFe). In devices which have been fabricated, the width of the strips is typically about 3$\mu$m, while the length is typically about 5–15$\mu$m. Permalloy strips 1, 2, and 3 are overlayed on a magnetic wafer, a small section of which is labeled 14, and extend outwardly from a localized region in which it is desired to nucleate a magnetic bubble. Strips 1, 2, and 3, are shown as being symmetrically positioned over an angular span of 90°, but greater or lesser angular ranges can also be employed with concommitant variations in operation that will be explained further below. Also overlayed on the magnetic wafer is a current conducting line 4, typically fabricated from a highly conducting material such as gold. This current line may be overlayed during the same fabrication step which produces other current lines placed on the wafer for various control functions. Current line 4 includes three segments 5, 6, and 7 which together form a loop-like section encompassing a localized region of the magnetic wafer where a magnetic bubble is to be nucleated. Also shown are three other permalloy elements 8, 9, and 10 which comprise the beginning of a track which operates in conjunction with an applied rotating magnetic field to propagate the nucleated magnetic bubbles around the magnetic wafer (see e.g. co-pending U.S. Pat. application Ser. No. 345,050 mentioned above). In operation, the same rotating magnetic field which magnetizes the permalloy elements of the propagating track also magnetizes the permalloy elements included in the magnetic bubble generator. As the phase of the rotating field sweeps through the angular range in which the magntic strips 1, 2, and 3 are distributed, the strips 1, 2, and 3 are magnetized in sequence, each strip producing a fringing magnetic field in the localized region of the wafer in which a magnetic bubble is to be generated. However, the strips 1, 2, and 3 are positioned a sufficient distance above the magnetic wafer that the magnitude of the combined fringing fields of the strips 1, 2, and 3 is insufficient by itself to induce a reversal of the direction of the magnetization in the magnetic wafer. However, when a current is pulsed through the current line 4, an additional magnetic field is produced which also penetrates the magnetic wafer. Because of the loop-like configuration of the segments 5, 6, and 7, the magnetic field of the current line 4 will add to the fringing fields of the permalloy strips in the localized region encompassed by the loop. The magnitude of the current pulse is adjusted so that the combined magnetic field strength will be greater than the nucleation threshold for spin reversal in the magnetic wafer. In the localized region, a spin reversal domain will be therefore formed which will stabilize as a magnetic bubble. Outside of the localized region, the magnetic field generated by the current line 4 tends to oppose the fringing fields, thereby helping to localize the nucleation of the magnetic bubbles in the region of the magnetic wafer immediately adjacent to the start of the propagating track. Thus, it is assured that the nucleated bubbles will enter the track properly, rather than freely floating around the wafer. Typical currents which have been used to nucleate magnetic bubbles are in the range 50 ma to 100 ma. For the configuration of FIG. 1, magnetic bubbles can be nucleated when the phase of the applied rotating magnetic field is within the 90° range in which the permalloy elements 1, 2, and 3 are positioned. The phase window in which bubbles may be nucleated can be increased or decreased by increasing or decreasing the range of angles over which the permalloy generating elements are distributed. Since magnetic bubbles are produced only when the current line 4 is pulsed, the bubble generator illustrated here may be used to perform the write function of a memory directly. No bubble transfer switches are required in the bubble circuit. Furthermore, the generating elements need not be positioned nearer to the surface of the wafer than the other permalloy elements comprising the propagating tracks, so that during fabrication, there is no additional step necessary to etch a window in the spacer layer which separates the permalloy elements from the magnetic wafer.

Figure 2:
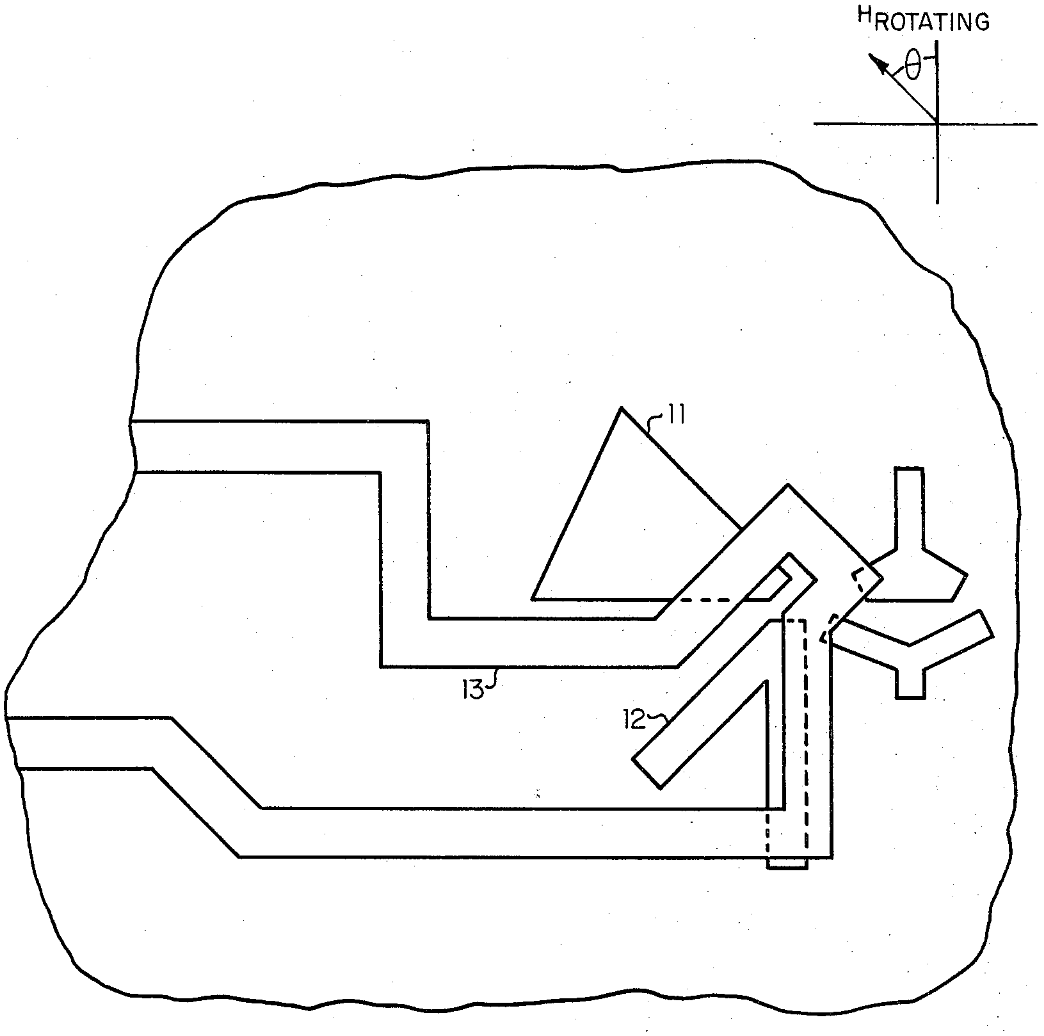
FIG. 2 illustrates a magnetic bubble generator in accordance with another embodiment of the present invention.

FIG. 2 shows a wedge-shaped permalloy element 11 which is used in conjunction with a V-shaped element 12 to create the fringing field contribution to the total magnetic field which nucleates magnetic bubbles. The use of wedge-shaped and V-shaped elements may help to better localize the area in which the bubbles are nucleated. Also in this embodiment of the invention, the current line 13 enters the region where a bubble is to be nucleated from an area between the permalloy elements 11 and 12.

We claim:

1. A device for generating magnetic bubbles in a wafer of a magnetic material, said device comprising:

a plurality of elements of a highly permeable magnetic material overlayed on the wafer of a magnetic material and outwardly extending from a localized region of the wafer in which magnetic bubbles are to be generated, the elements operating in response to an applied rotating magnetic field to provide a first magnetic field in the localized region of the wafer, the magnitude of this first magnetic field being insufficient to induce a reversal of the direction of the magnetization in the wafer; and a current line overlayed on the wafer and positioned so that a portion of the current line forms a loop-like segment around said localized region of the wafer, for providing a second magnetic field in said localized region of the wafer whenever a current is pulsed through the current line, the combined magnitudes of the first and second magnetic fields being sufficient to induce a reversal of the direction of the magnetization in said localized region of the wafer.

2. A device as in claim 1 wherein each of said plurality of elements comprises a rectangular strip.

3. A device as in claim 1 wherein at least one of said plurality of elements comprises a wedge-shaped element.

4. A device as in claim 1 wherein said plurality of elements is fabricated from permalloy (80-20 NiFe).

5. A method for nucleating magnetic bubbles in a wafer of a magnetic material, said method comprising the steps of:

applying a first magnetic field to a localized region of the magnetic wafer, the magnitude of this first magnetic field being insufficiently large to induce a reversal of the direction of the magnetization in the wafer; and applying a second magnetic field to the localized region of the wafer, the combined magnitude of the first and second magnetic fields being sufficiently large to induce a reversal of the direction of the magnetization in this localized region of the magnetic wafer.

6. A method for nucleating magnetic bubbles as in claim 5 wherein the step of applying a first magnetic field comprises the step of applying a rotating magnetic field to an arrangement of permeable elements, the permeable elements in turn producing a first magnetic field by generating fringing magnetic fields near the ends of the elements.

7. A method for nucleating magnetic bubbles as in claim 5 wherein the step of applying a second magnetic field comprises the step of pulsing a current through a current line, thereby producing the second magnetic field.

* * * * *

Notice of Adverse Decision in Interference

In Interference No. 99,192, involving Patent No. 3,824,571, R. B. Clover, Jr., and R. F. Waites, MAGNETIC BUBBLE GENERATION, final judgment adverse to the patentees was rendered Mar. 2, 1977, as to claims 1, 2, 5, 6 and 7.

[*Official Gazette July 5, 1977.*]